May 12, 1970   J. CANADAY ET AL   3,512,156
QUASIMONOPULSE RADAR SYSTEM
Filed March 2, 1964   5 Sheets-Sheet 1

INVENTORS
JAMES A. CANADAY
JEROME C. HILL
BY

SIDNEY MAGNES
AGENT

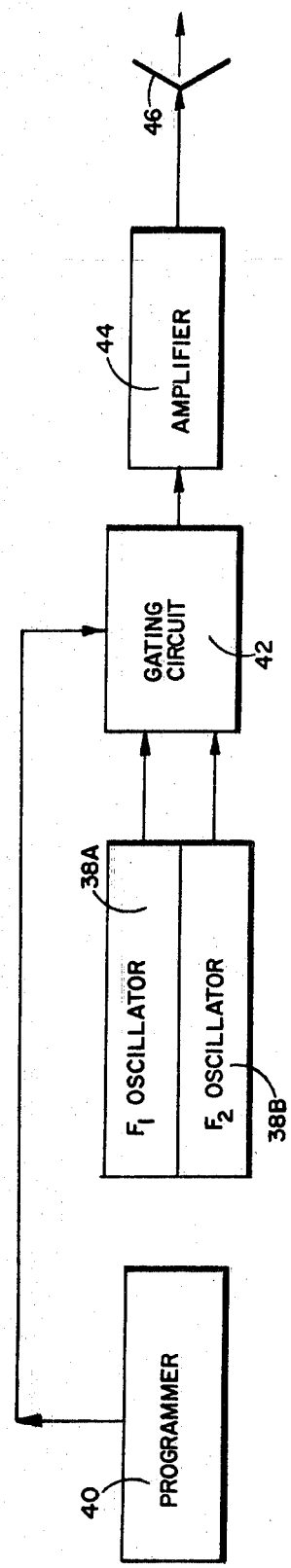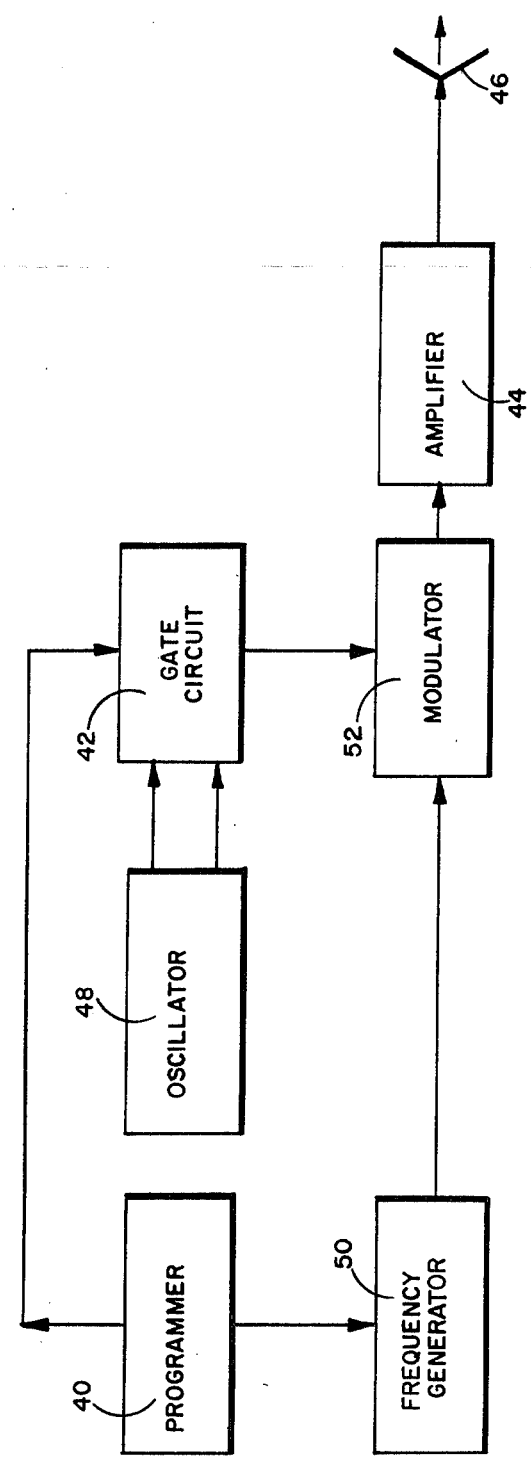

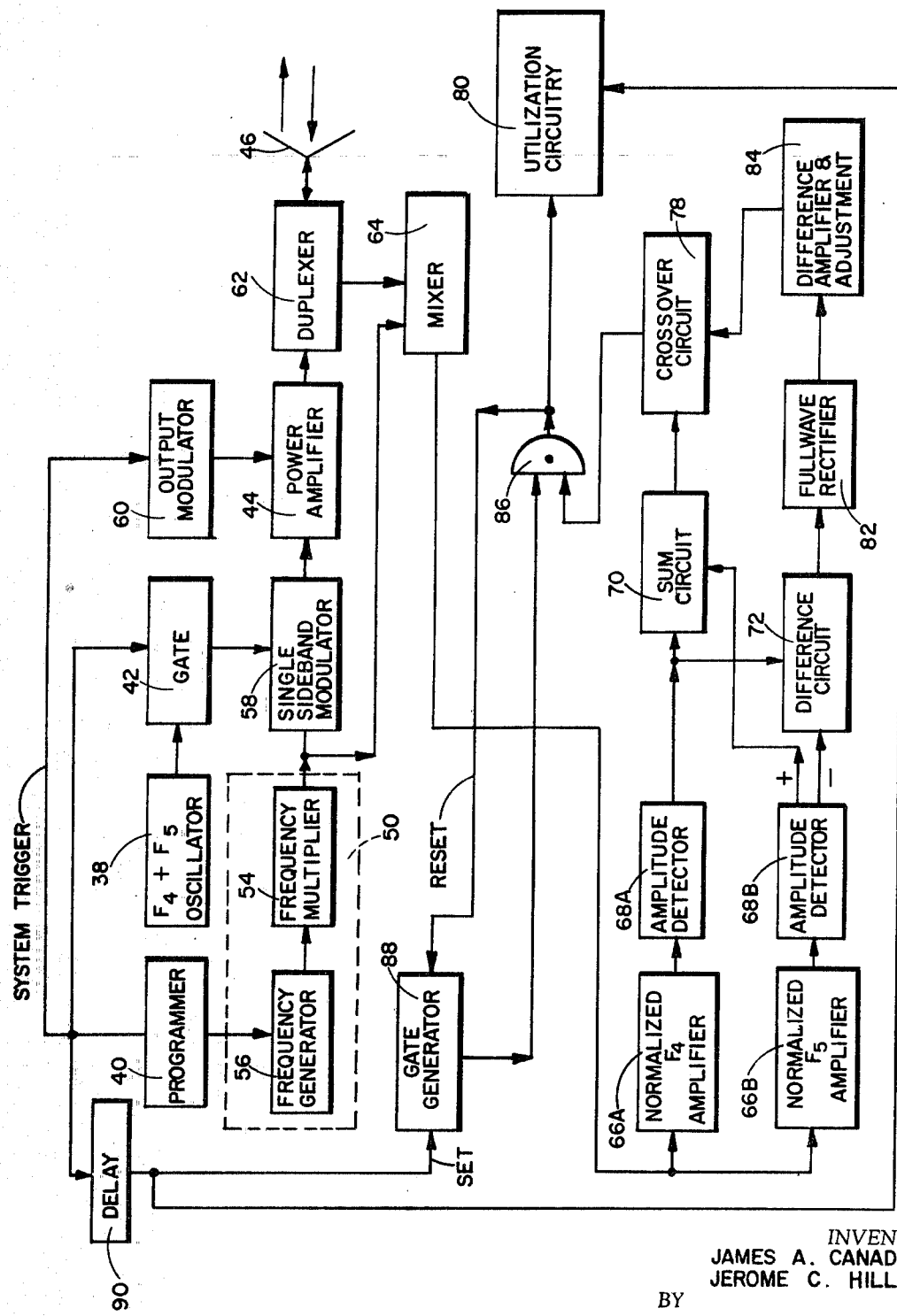

United States Patent Office 3,512,156
Patented May 12, 1970

3,512,156
QUASI-MONOPULSE RADAR SYSTEM
James A. Canaday and Jerome C. Hill, Fullerton, Calif., assignors to North American Rockwell Corporation, a corporation of Delaware
Filed Mar. 2, 1964, Ser. No. 348,733
Int. Cl. G01s 9/02
U.S. Cl. 343—16                    2 Claims This invention relates to a radar system; and more particularly to a "quasi-monopulse" radar system.

As is well known, radar operates upon the "echo" principle. In operation, radar energy is transmitted outwardly from a radar station—ship or ground-based, or air-borne—toward a target; and some of the energy that impinges upon the target is reflected back toward the radar station in the form of an "echo" signal. At the radar station, the echo signal is detected and processed to provide target information.

"Distance" target-information is obtained by measuring the interval of time taken by the energy to reach the target, and to be reflected back to the radar station.

"Direction" target-information is obtained as follows. Since the antenna must be aimed toward the target in order for the energy to impinge upon and be reflected by the target, the orientation of the antenna is therefore an indication of the direction of the target with respect to the radar station.

In this way radar provides both the direction and distance of the target.

One mode of radar operation locates targets by searching a given portion of the sky, ocean, terrain, etc. One way of doing this is to sequentially aim the antenna in different directions; and to await the return of an echo signal that indicates the presence of a target in that direction. By sequentially aiming the antenna in a given manner, a given target-area can thus be searched.

One way of detecting targets at ever-greater distances, and pin-pointing their locations more precisely, is to use increasingly-larger antennas. As may be realized, the increased mechanical size and weight of the antenna make it more difficult to rotate the antenna, and to precisely aim its axis in a given target-direction. This is especially disadvantageous in air-borne systems, wherein the available space and allowable weight of the antenna and its aiming equipment, are severely limited.

In order to more precisely locate the targets without increasing the antenna size, a number of techniques have been introduced, one of which is known as the "monopulse" system.

In the monopulse system, radar energy is transmitted toward the target; and the antenna is converted to two sub-antennas that receive separate echo signals. The separate echo signals are operated upon in such a way as to generate an "error" signal that can be used to determine (for a target within the beamwidth of the antenna) how far the "boresight axis" of the composite antenna is "off" from the direct line to the target.

The above-described monopulse radar concept has the advantage that it can provide more precise information about the direction of the target; but the antenna is of necessity more complex in order to provide the separate echo signals—and the antenna still has to be phyically rotated in order to search an appreciably-large target area.

In order to permit searching the target area without physically moving the large antenna, another concept known as "electronic-steering" was introduced. This concept depends upon the fact that an antenna may be designed so that energy of a given frequency is directed outwardly in a given direction; but when the frequency is changed, the energy is transmitted outwardly in a different direction.

Thus, in electronic-steering, by sequentially varying the frequency, the transmitted energy is directed to progressively different portions of the desired target-area. In this way the target-area is searched; the antenna remaining physically fixed during this time.

As may be realized, the ability of the electronic-steering concept to obviate rotating the antenna is a decided advantage; despite the fact that the electronic circuitry for handling the various frequencies becomes somewhat more complex.

Thus, the electronic-steering concept has the advantage of using a fixedly-positioned antenna; while the monopulse-concept has the advantage of providing more precise target-direction information.

It should be noted that, because of a characteristic known as "reciprocity," an antenna has substantially the same transmission-pattern and reception-pattern. Therefore, the term "beam" will be used hereinafter to indicate the antenna pattern; rather than its use.

It is the principal object of the present invention to provide an improved radar system.

The attainment of this object, and others, will be realized from the following specification, taken in conjunction with the drawings of which:

FIGS. 3 and 4 shows block-diagrams for practicing the present invention;

FIG. 8 shows another block diagram for practicing the present invention; and

Broadly speaking, the present invention provides the advantages of the electronic-steering concept, combined with the advantages of the monopulse concept. The present invention achieves this result by producing a radar beam-pattern comprising a pair of overlapping beams of energy for each of the electronic-steering frequencies; and provides quasi-monopulse means for precisely locating a target. Moreover, the present invention discloses how to use, if desired, only information from targets on the boresight axis of the particular pair of beams associated with a given frequency.

In order to understand the present invention, the reader will find it helpful to understand the basic concept of the monopulse radar system; and therefore a very brief description of this system will be presented at this time.

Figure 1:
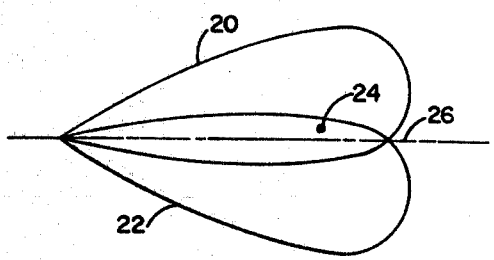
FIG. 1 shows a pair of radar beams for providing target information.

Assume that the presence of a target is suspected; and that two sub-antennas are concomitantly excited to transmit a single burst or pulse of radar energy toward the target. FIG. 1 shows the overlapping reception-lobes 20 and 22 of the sub-antennas. If the anntenna is properly aimed, the target 24—even though it is not on the boresight axis 26 of the composite antenna—will be within the scope (lobe) of each sub-antenna. Each sub-antenna will therefore receive a slightly-different echo signal. As previously indicated, the two echo signals are separated; are added to produce a so-called "sum" signal; and are subtracted to produce a so-called "difference" signal. The sum and difference signals are used to indicate the direction and distance of the target.

It was previously pointed out that by the use of the electronic-steering technique, a beam of radar energy can be transmitted in a given direction; the direction being controlled by the frequency of the radar energy. This is illustrated, in FIG. 2, where a primary beam 30—indicated by dotted lines—has a particular direction that depends on the frequency of the radar energy; the direction of primary beam 30 being defined in terms of the direction of its axis 31.

If now, the frequency of the energy is increased slightly, this change is frequency will produce a secondary beam 32 that is displaced slightly relative to the primary beam 30. Similarly, if the frequency of the energy is decreased slightly, this change in frequency will produce another secondary beam 34 that is displaced in the opposite direction relative to primary beam 30.

Thus, if the frequentcy of the "steered" primary beam 30 is increased and decreased a suitable amount, two overlapping, "steered" secondary beams will be produced; these two secondary beams being symmetrical about the axis of the primary beam.

Because of the theory of reciprocity, the antenna will have similar transmission and reception patterns. Therefore, while the secondary beams 32 and 34 have been described in terms of a transmission-pattern, they also form a reception-pattern; and thus, as will be shown later, the two secondary "steered" beams—32 and 34 of FIG. 2—correspond to the two reception-beams 20 and 22 of FIG. 1—used in the monopulse radar system.

Figure 2:
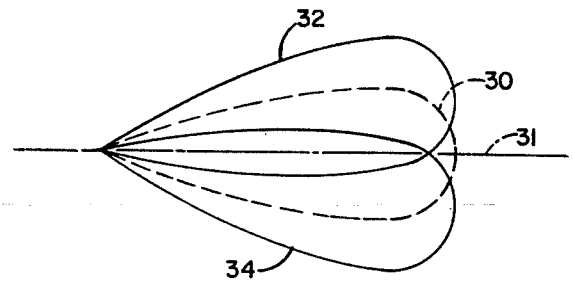
FIG. 2 shows a pair of radar beams produced by the present invention.

Since the first secondary beam 32 of FIG. 2 has a slightly different frequency than the second secondary beam 34 of FIG. 2, the return echo signals corresponding to each of the beams are of different frequencies; whereas, in the usual monopulse system, both return signals have the same frequency.

Thus, since the echo signals resulting from secondary beams 32 and 34 can be distinguished from each other because of their different frequencies, the secondary beams 32 and 34 of FIG. 2 form a pair of beams that can be used in a quasi-monopulse radar system; especially if they exist simultaneously.

It should be noted that secondary beams 32 and 34 may be produced simultaneously or sequentially, depending upon the requirements of the radar system. For simplicity of explanation, the following explanation will be conducted in terms of sequentially-produced secondary beams; although this simplification is not to be construed as a limitation.

FIG. 3 shows a block diagram for producing two secondary beams. Here two oscillators 38A and 38B produce signals having frequencies of $F_1$ and $F_2$ respectively.

A programmer 40 activates a gating circuit 42 that permits the oscillator signals to be applied alternately to an amplifier 44; from whence they are transmitted by a frequency-sensitive antenna 46.

As explained above, the difference in frequency of the signals produces two differently-directed, steered beams of energy; and if the frequencies of the oscillators are properly chosen, the beams may be suitably offset to produce overlapping beams.

The programmer 40 and gating circuit 42 of FIG. 3 may be designed to permit both frequencies $F_1$ and $F_2$ to be applied to the antenna 46 simultaneously; or they may be designed to permit the frequencies $F_1$ and $F_2$ to be applied to the antenna 46 alternately. In this way the resultant overlapping beams may be produced simultaneously or sequentially.

FIG. 4 shows another way of producing the above-described beams; this illustration comprising a single oscillator 48, and a voltage-controlled frequency-generator 50. If the signal from frequency generator 50 were transmitted, it would produce the specifically-directed primary beam 30 of FIG. 2.

However, in FIG. 4, the signal from the frequency-generator 50 is not transmitted. Instead, it is modified by the signal from oscillator 48; the modification being performed by a modulator 52. Assuming that the signal from frequency-generator 50 has a frequency of $F_a$, and that the signal from oscillator 48 has a frequency of $F_3$, the output from modulator 52 would have frequencies of $(F_a+F_3)$ and $(F_a-F_3)$.

This arrangement automatically provides two signals of mutually exclusive frequencies that are equally but oppositely displaced in the frequency domain from the basic frequency, $F_a$; and a suitable choice of the oscillator frequency, $F_3$, assures that the resultant beams (32 and 34 of FIG. 2) will be suitably steered to provide a desired overlapping pattern having an axis of symmetry about boresight axis 31.

It should be noted that since the basic frequency-generator signal having a frequency of $F_a$ is not transmitted, no primary beam 30 is produced.

One more thing should be noted. The direction of the transmitted energy of the overlapping beams is dependent upon the concept of electronic-steering; and thus depends upon the basic frequency $F_a$ from the frequency-generator 50.

The present invention permits the secondary-beams to be electronically-steered, relative to the antenna, in order to search the target-area; without physically rotating the antenna. This result is achieved as follows.

It was previously indicated that the frequency-generator 50 produces a basic frequency, $F_a$, that is modified by the output of the oscillator to produce a pair of secondary beams. These two secondary beams, because of their relation to the basic frequency, $F_a$, are aimed in given directions; and are shown as secondary beams 32A and 34A of FIG. 5—these being symmetrical about their boresight axis 53A, whose direction is determined by the frequency $F_a$.

In order to change the direction in which the overlapping secondary beams are aimed, programmer 40 of FIG. 4 changes the operation of frequency generator 50 so that it produces a second, slightly-different basic frequency $F_b$; which is now modified by the output of the oscillator 48 to produce a second pair of secondary overlapping beams, of frequency $(F_b+F_3)$ and $(F_b-F_3)$. These secondary beams are transmitted in a direction that depends on the frequency $F_b$; the second pair of secondary beams being indicated at 32B and 34B of FIG. 5, and being symmetrical about their boresight axis 53B, whose direction is determined by the frequency $F_b$. In this way, the radar energy is now transmitted in the form of another pair of overlapping secondary beams, in a slightly different direction—without physically rotating the antenna.

The programmer 40 of FIG. 4 then operates upon frequency generator 50 to provide a third basic frequency $F_c$, which is then changed by the operation of the oscillator 48 to produce a third pair of overlapping secondary beams, of frequency $(F_c+F_3)$ and $(F_c-F_3)$. These secondary beams are transmitted in a slightly different direction; the third pair of secondary beams being indicated at 32C and 34C of FIG. 5, and being symmetrical about their boresight axis 53C, whose direction is determined by the frequency $F_c$.

Figure 5:
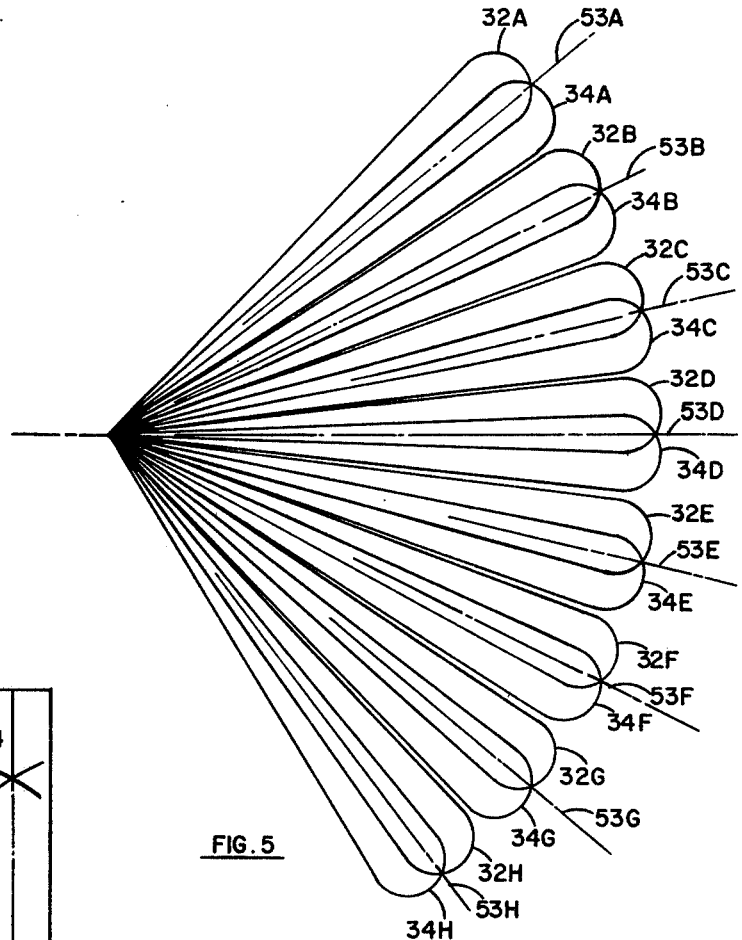
FIG. 5 shows a pattern of pairs of radar beams produced by the present invention.

It may thus be seen that by properly programming programmer 40, the equipment produces a plurality of pairs of overlapping secondary beams that are aimed in different directions. Thus an entire target area may be searched by these pairs of secondary beams, as shown in FIG. 5, without physically rotating the antenna.

Figure 6:
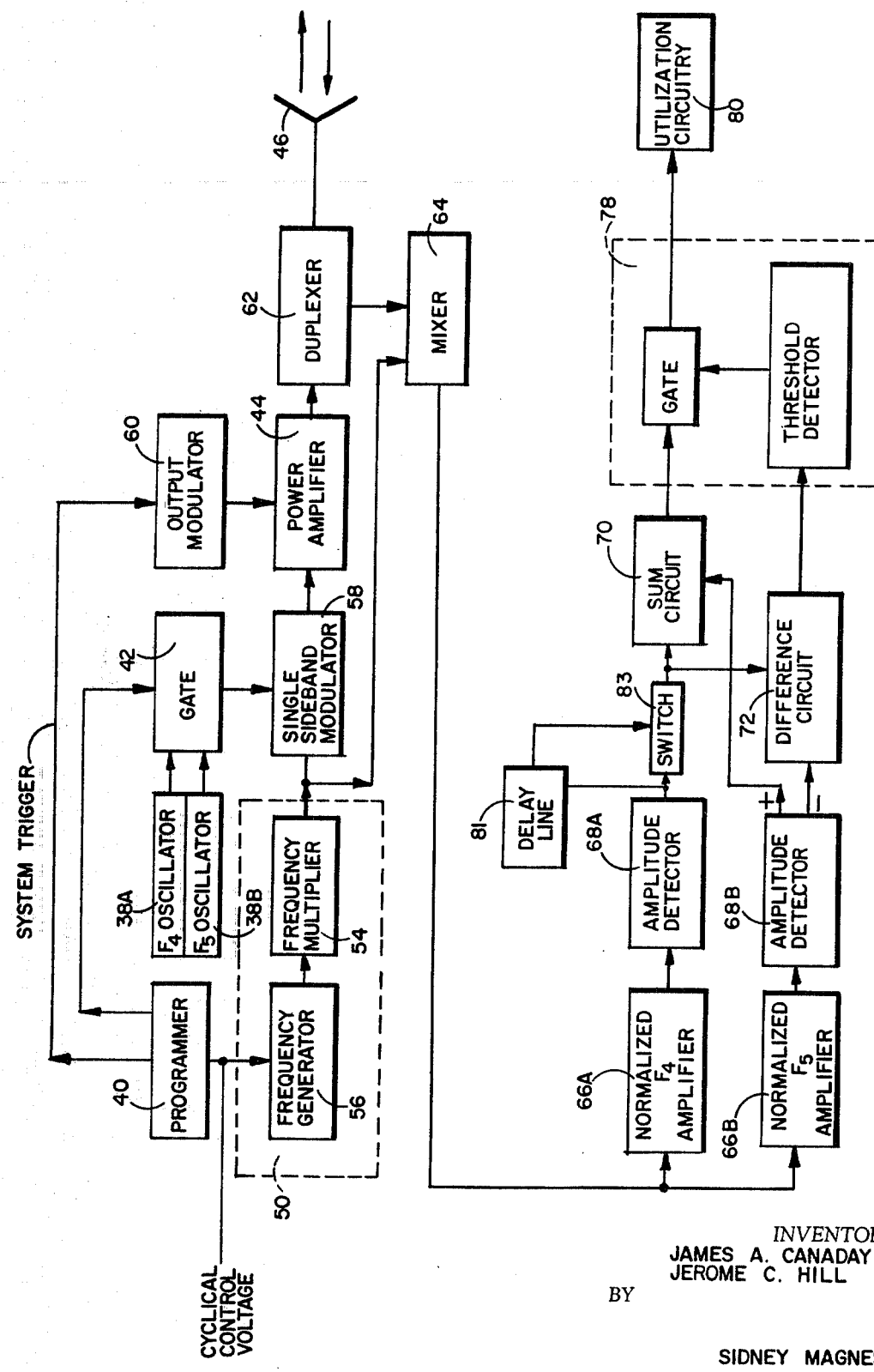
FIG. 6 shows another block diagram for practicing the present invention.

FIG. 6 shows an arrangement for generating, transmitting, and utilizing the secondary beams. The upper generating-and-transmitting portion of FIG. 6 is similar to that previously described, except that it contains a frequency multiplier 54 that multiplies the frequency of the signals produced by frequency-generator 56. This frequency-generating arrangement permits the advantageous generation of lower frequencies, which may then be multiplied to the frequency desired.

In FIG. 6, when the oscillator signals are combined with the first signal from frequency-generator 50, the operation is such that the output of modulator 58 is two signals having frequencies of $(F_a+F_4)$ and $(F_a+F_5)$.

FIG. 6 also shows an output modulator 60, under the control of programmer 40, that operates upon power amplifier 44 to produce bursts of energy that are transmitted outwardly by antenna 46.

The operation of the transmitter of FIG. 6, as thus far disclosed, may be summarized as follows.

A basic signal, say of frequency $F_a$, from frequency-generator 50 is modified to provide two signals of frequencies of $(F_a+F_4)$ and $(F_a+F_5)$. The previously-described programmer and circuitry cause the overlapping secondary beams to be produced sequentially or simultaneously; and to be transmitted in bursts at a predetermined repetition rate and in predetermined directions.

FIG. 6 also shows a duplexer 62, the construction and operation of which is well known in the art. When the circuitry is used for transmitting signals, duplexer 62 permits the signals to pass from power amplifier 44 to the antenna 46. However, when the echo signals are being received by antenna 46, the duplexer 62 directs the received signals to a mixer 64.

Mixer 64 thus receives the echo signals from the target, and also receives a signal of the basic frequency from the frequency generator 50. The operation of mixer 64 is such that it "beats" these two signals together, so that the output of mixer 64 comprises signals of frequency $F_4$ and $F_5$.

The $F_4$ and $F_5$ signals are applied to frequency-selective normalizing or logarithmic amplifiers 66A and 66B, whose outputs are applied to amplitude-detectors 68A and 68B. When the circuitry operates to transmit the energy of the secondary lobes in a simultaneous manner, the echo signals are of course received simultaneously; and the suitably-poled outputs of amplitude detectors 68 are applied to the "sum" circuit 70, and to the "difference" circuit 72; these applying their outputs through a crossover circuit 78 (to be described later) to a utilization circuit 80 that may operate in the usual manner to indicate the range and direction of the target.

When the circuitry operates to transmit the energy of the secondary lobes in a sequential manner, the echo signals are of course received in a sequential manner. Under this mode of operation, a delay-line 81 is used to delay the echo signal resulting from one beam by an amount corresponding to the pulse repetition rate of the transmitter so that it can be compared with the echo signal resulting from the other beam. A switch 83, which may if desired be operated by programmer 40, causes one echo signal to either bypas or go through delay-line 81.

After a suitable interval, programmer 40 causes the frequency-generator 50 to produce a different basic frequency, so that the next pair of overlapping secondary beams is transmitted in a different predetermined direction.

Thus, the present invention provides means for obtaining the increased angular resolution advantage of the monopulse concept, and also provides means of obtaining the non-rotating-antenna advantage of electronic-steering.

There are times when it is desirable to obtain the direction of only an on-boresight target, while still using the advantage of the monopulse concept and the advantage of electronic-steering.

The reasons for this arise mainly from considerations of the "ground-clutter" phenomenon which tends to obscure the detection of the presence and direction of small airborne targets and terrain prominences against a large background area of terrain for all such small targets except those lying along the direction of the antenna boresight.

Such on-boresight data processing can be provided by the present invention in accordance with the following exposition.

Figure 7:
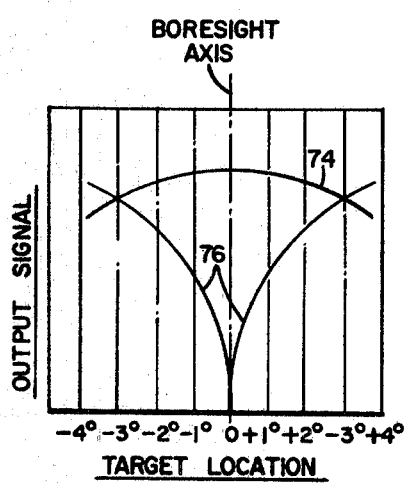
FIG. 7 shows the relation of the sum-signal and the difference-signal produced by the device of FIG. 6.

For reasons that are too technical to be considered at this time, when the output of sum-circuit 70 of FIG. 6 is plotted against the location of the target, the resultant graph appears as shown by reference character 74 of FIG. 7. Similarly, for reasons too technical to be considered at this time, when the output of difference-circuit 72 of FIG. 6 is plotted against the location of the target, the graph appears as indicated by reference character 76 of FIG. 7.

It will be seen from FIG. 7, that as the target gets closer to the boresight axis, the signal from the sum-circuit—as represented by waveform 74, becomes appreciably larger than the signal from the difference-circuit—as represented by waveform 76. Therefore, for targets very close to—if not exactly on—the boresight axis, the ratio of the sum-signal to the difference-signal is quite high. Thus if an arbitrary ratio, of say 20, is chosen for the sum-circuit signal to difference-circuit signal ratio, this means that when the sum signal is at least 20 times as large as the difference signal, the target is precisely on-boresight or in position to cross the boresight-axis.

Thus, the antenna may be aimed in such a way that the antenna's boresight axis points directly along the flight path of the plane; is aimed in the general direction of a moving target; or the boresight axes of the pairs of secondary beams may be scanned across a target area. During this time the echo signals from the target will be continually received and operated upon as described above. At the precise instant that the target is on-boresight, or crosses the boresight axis, the ratio of sum-signal to difference-signal will reach or exceed the chosen value of 20.

This concept is used in FIG. 6, specifically in the crossover circuit 78. When crossover circuit 78 senses that the ratio of the sum-signal to the difference-signal approaches the assigned value of 20, this means that the target is on, or in position to cross the boresight axis of the particular pair of secondary beams being used at that moment. When the chosen ratio is sensed, the crossover circuit 78 transmits the signals from sum-circuit 70 and difference-circuit to utilization circuit 80. Alternatively, circuit 78 may produce its own output signal that is applied to utilization circuit 80.

Where the sum and difference signals are derived from normalized signals, as provided by the use of logarithmic processors 66A and 66B, the strength of the derived sum and difference signals from elements 70 and 72 will tend to be invariant with signal strength and the difference signal output of element 72 will tend to vary only as a function of the angle-off-boresight of a detected target. In such case, crossover circuit 78 may be comprised of a simple threshold signal detector responsive to element 72 for gating-off a gated output of sum circuit 70 when the difference signal from difference circuit 72 exceeds a certain threshold value indicative of an off-boresight condition.

Thus, the circuit of FIG. 6 produces pairs of overlapping secondary beams, steers them electronically relative to the boresight axis of the antenna, directs them toward a target, receives the echo signals from the target, and processes the echo signals to produce sum and difference signals. When the ratio of the sum and difference signals exceeds a predetermined value that indicates the target is precisely on the boresight axis, the utilization circuit computes the distance and direction to the target; or performs some other predetermined function.

In an airborne terrain avoidance mode of operation, the radar energy may be reflected from two different-distanced mountain peaks that are both in substantially the same direction from the airplane. In this case it may be necessary to avoid the closer mountain; leaving the more distant mountain to be avoided later in the flight.

The present invention can restrict its reception to the echo signal from the closest objectionable terrain; and accomplishes this by use of the circuit of FIG. 8. This circuit is similar to those previously discussed, the difference being (1) the use of a full-wave rectifier 82 and a difference-amplifier 84 for providing a better difference-signal to the crossover circuit 78, and (2) the use of an "AND" coincidence circuit 86 that limits the reception of the echo signals to those originating at the nearest objectionable terrain.

The nearest-target echo-signal limitation operates as follows. When the programmer 40 applies a trigger signal to modulator 60, causing a burst of radar energy to be emitted from the antenna, the trigger signal is simultaneously applied to gate 42, and is also applied through a delay 90 to utilization means 80 and to "gate" generator 88 such as a bistable multivibrator or flip-flop. This trigger signal establishes a given operating state for the gate generator, and causes it to continuously apply a "gating" signal to the AND circuit 86. The purpose of delay element 90 is merely to prevent premature receiver response to the transmitted pulse from power amplifier 44.

Figure 9:
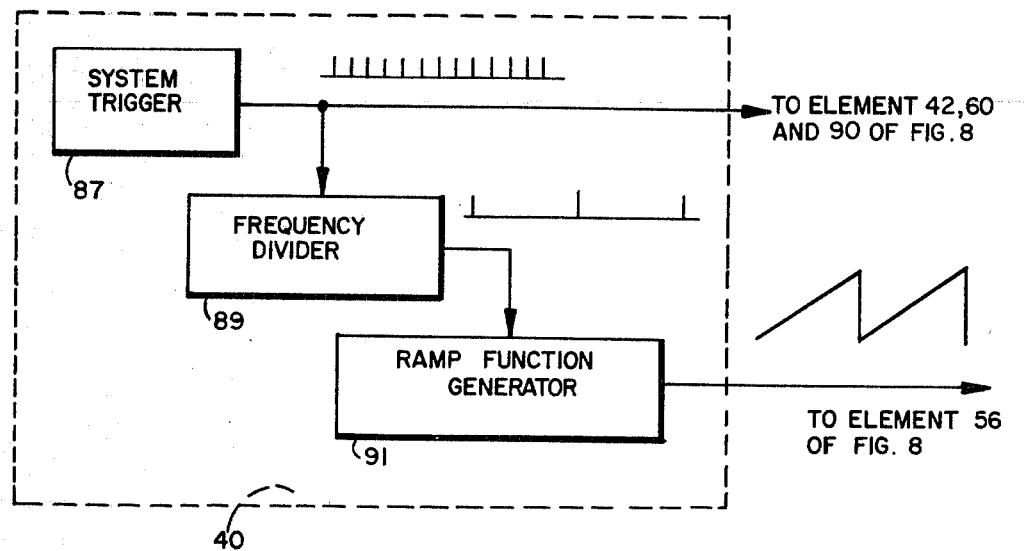
FIG. 9 shows a block diagram of the programmer of FIG. 8.

An exemplary arrangement of programmer 40 is shown in FIG. 9.

Referring to FIG. 9, an exemplary arrangement of the programmer 40 of FIG. 8 is shown in block diagram form. There is shown a system trigger 87 or like means known in the art for generating a cyclical control pulse which is fed to elements 42, 60 and 90 of FIG. 8. The output of system trigger 87 is also fed to a frequency divider 89 for use in the control of a ramp-function generator 91 or other periodically increasing signal source, whereby a cyclical control voltage is generated, the amplitude range of which is used to control the voltage-controlled frequency generator 56 (of FIG. 8) over the desired range of frequencies, and the periodicity of which cyclical control voltage corresponds to the desired antenna scan rate provided by the programmed frequencies of voltage-controlled frequency generator 50 (of FIG. 8).

Referring again to FIG. 8, as soon as the crossover circuit 78 of FIG. 8 senses that a target is on the boresight axis, it also applies a signal to the AND circuit 86. Since the AND circuit requires two simultaneous signals to operate, the presence of signals from gate generator 88 and from crossover-circuit 78 satisfies this condition; and the AND circuit produces an output signal.

The output signal from the satisfied AND circuit 86 is applied to two separate places. A first portion of the AND circuit output signal is applied to utilization circuitry 80 to be used for the purpose of the radar system.

The second portion of the AND circuit's output signal is fed back to the gate generator 88 to disable it. Since gate generator 88 is now disabled, it no longer provides a gating signal to the AND circuit 86. The absence of this gating signal disables the AND circuit.

If now, a later-received echo signal from a more-distant mountain is received, and causes crossover circuit 78 to apply a signal to the AND circuit 86, only one signal will be present at the AND circuit (due to the absence of the gating signal from the now-disabled gate generator 88); and therefore the AND circuit will not produce an output signal for the utilization circuit. This arrangement assures that, when desired, only the first signal from objectionable terrain will be utilized.

It will be realized that the boresight axis 53 of each pair of secondary beams of FIG. 5 will be displaced at a predetermined angle, relative to the antenna, depending upon the basic frequency produced by the frequency-generator 50. Since the operation of the frequency-generator is controlled by the programmer in FIG. 8, information from the programmer 40 is applied to the utilization circuitry 80 to indicate just how far each particular boresight-axis 53A–53H has been displaced from the boresight axis of the antenna. This information, and the operation of the crossover circuit, provides extremely precise indication of the orientation of the beams; and thus of the location of the target.

Although the invention has been illustrated and described in detail, it is to be clearly understood that the same is by way of illustration and example only and is not to be taken by way of limitation; the spirit and scope of this invention being limited only by the terms of the appended claims.

We claim:
1. In a radar system having a frequency sensitive antenna, quasi-monopulse means for determining the direction of energy reflections received from a detected radar target in the scanning direction of said antenna, comprising in combination:
  means cooperating with said antenna for generating a first and second transmitted beam of energy having a respective first and second frequency, said first and second frequencies differing by a preselected difference and corresponding to said beams being mutually angularly squinted in said scanning direction and overlapping in space to define a boresight axis;
  programming means for commonly translating said frequencies of said beams by like increments whereby the boresight axis of said frequency sensitive antenna is caused to scan;
  first and second frequency-sensitive, intermediate frequency receiver-amplifiers, each responsive to a mutually exclusive one of the received reflections of said transmitted energy beams of mutually exclusive frequency for providing a respective first and second intermediate frequency signal;
  video detection means responsive to said first and second intermediate frequency signals for providing a respective first and second video detected signal; and
  means responsive to said first and second video detected signals for providing the difference therebetween providing an indication of the angular position in the scanning direction of a detected target relative to said scanning boresight axis.

2. In a radar system having a frequency sensitive antenna, quasi-monopulse means for determining the direction of energy reflections received from a detected radar target in the scanning direction of said antenna, comprising in combination:
  periodic means cooperating with said antenna for generating an alternate one of a first and second transmitted beam of energy having a respective first and second frequency, said frequencies differing by a preselected frequency difference corresponding to said beams being mutually angularly squinted in said direction and overlapping in space as to define a boresight axis;
  programming means coupled to said periodic means for commonly translating said frequencies of said beams by successive increments whereby the boresight axis is caused to scan;
  receiver mixer means coupled to said antenna and said periodic means for providing first and second intermediate frequency signals indicative of corresponding echoes of said two alternately transmitted beams of different frequency;
  a first and second narrow band pass means having mutually exclusive center frequencies, the center frequency signal resulting from echoes of a mutually exclusive one of said alternately transmitted beams of different frequency, for providing a first and second detected signal;
  delay means for delaying said first detected signal by an amount equal to the periodic interval between said first and second alternately transmitted beams of energy of different frequency; and
  difference detection means responsive to said first delayed detected signal and said second detected signal for providing a signal indicative of the difference therebetween and corresponding to the angular position in the scanning direction of a detected target relative to said scanning boresight axis.

References Cited

UNITED STATES PATENTS 3,083,360 3/1963 Weltz et al. _____ 343—16

FOREIGN PATENTS 610,664 10/1948 Great Britain.

RODNEY D. BENNETT, Jr., Primary Examiner
M. F. HUBLER, Assistant Examiner